US012579776B2

(12) United States Patent (10) Patent No.: US 12,579,776 B2
Suzuki et al. (45) Date of Patent: Mar. 17, 2026

(54) DISPLAY DEVICE, DISPLAY METHOD, AND COMPUTER-READABLE STORAGE MEDIUM

(71) Applicant: JVCKENWOOD Corporation, Yokohama (JP)

(72) Inventors: Tetsuji Suzuki, Yokohama (JP); Takayuki Sugahara, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 308 days.

(21) Appl. No.: 18/403,766

(22) Filed: Jan. 4, 2024

(65) Prior Publication Data

US 2024/0144641 A1     May 2, 2024

Related U.S. Application Data

(63) Continuation of application No. PCT/JP2022/024868, filed on Jun. 22, 2022.

(30) Foreign Application Priority Data

Jul. 12, 2021   (JP) ................................. 2021-115135

(51) Int. Cl.
    *G06V 10/60*      (2022.01)
    *G06F 16/58*      (2019.01)
    *G06F 16/587*      (2019.01)

(52) U.S. Cl.
    CPC .......... *G06V 10/60* (2022.01); *G06F 16/5866* (2019.01); *G06F 16/587* (2019.01)

(58) Field of Classification Search
    CPC .... G06V 10/60; G06F 16/587; G06F 16/5866
    See application file for complete search history.

(56) References Cited

U.S. PATENT DOCUMENTS

2015/0325045 A1   11/2015   Otsuru et al.
2017/0161878 A1*   6/2017   Omer ........................ G06T 5/50

FOREIGN PATENT DOCUMENTS

JP      5921753      4/2016

OTHER PUBLICATIONS

International Search Report and Written Opinion for International Application No. PCT/JP2022/024868 mailed on Sep. 20, 2022, 10 pages.

* cited by examiner

*Primary Examiner* — Gandhi Thirugnanam
*Assistant Examiner* — Michael Adam Shariff
(74) *Attorney, Agent, or Firm* — Amin, Turocy & Watson, LLP

(57)      ABSTRACT

A display device includes a map data acquisition unit configured to acquire map data including: image data of the ground, a time and date of the image data, positional data indicating a position where the image data was captured, and environmental change data in global environment per unit time at the position; a display condition acquisition unit configured to acquire information on a position and a time and date on the ground to be displayed; a global environment setting unit configured to set a global environment at the position and time and date to be displayed, by using a difference between the time and date of the image data and the time and date of the ground, and the environmental change data; a correction unit configured to correct the image data for the set global environment; and a display control unit configured to display the corrected image data.

4 Claims, 9 Drawing Sheets

| TIME AND DATE DATA | | | | | | POSITIONAL DATA | | ORIENTATION DATA | | IMAGE DATA |
|---|---|---|---|---|---|---|---|---|---|---|
| DOMINI-CAL | YEAR | MONTH | DAY | HOUR | MIN-UTE | SEC-OND | LONGI-TUDE | LATI-TUDE | HORIZON-TAL ORIENTA-TION | ELEVATION ANGLE ORIENTA-TION | IMAGE |

| TIME AND DATE DATA | | | | | | POSITIONAL DATA | | ORIENTATION DATA | | IMAGE DATA | ENVIRON-MENTAL CHANGE DATA |
|---|---|---|---|---|---|---|---|---|---|---|---|
| DOMINI-CAL | YEAR | MONTH | DAY | HOUR | MIN-UTE | SEC-OND | LONGI-TUDE | LATI-TUDE | HORIZON-TAL ORIENTA-TION | ELEVATION ANGLE ORIENTA-TION | IMAGE | ENVIRON-MENTAL CHANGE DATA |

Figure 7:
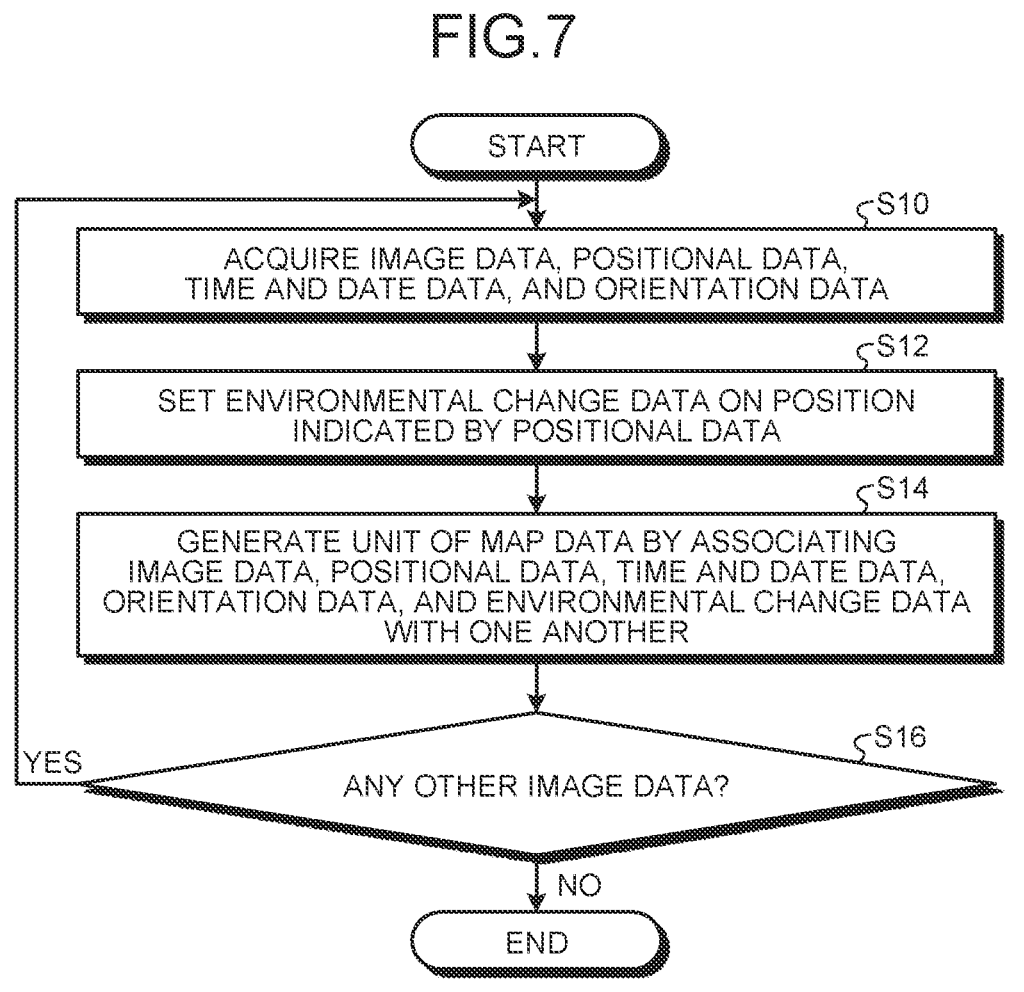

START

S10
ACQUIRE IMAGE DATA, POSITIONAL DATA, TIME AND DATE DATA, AND ORIENTATION DATA

S12
SET ENVIRONMENTAL CHANGE DATA ON POSITION INDICATED BY POSITIONAL DATA

S14
GENERATE UNIT OF MAP DATA BY ASSOCIATING IMAGE DATA, POSITIONAL DATA, TIME AND DATE DATA, ORIENTATION DATA, AND ENVIRONMENTAL CHANGE DATA WITH ONE ANOTHER

S16
ANY OTHER IMAGE DATA?

YES

NO

END

FIG.10

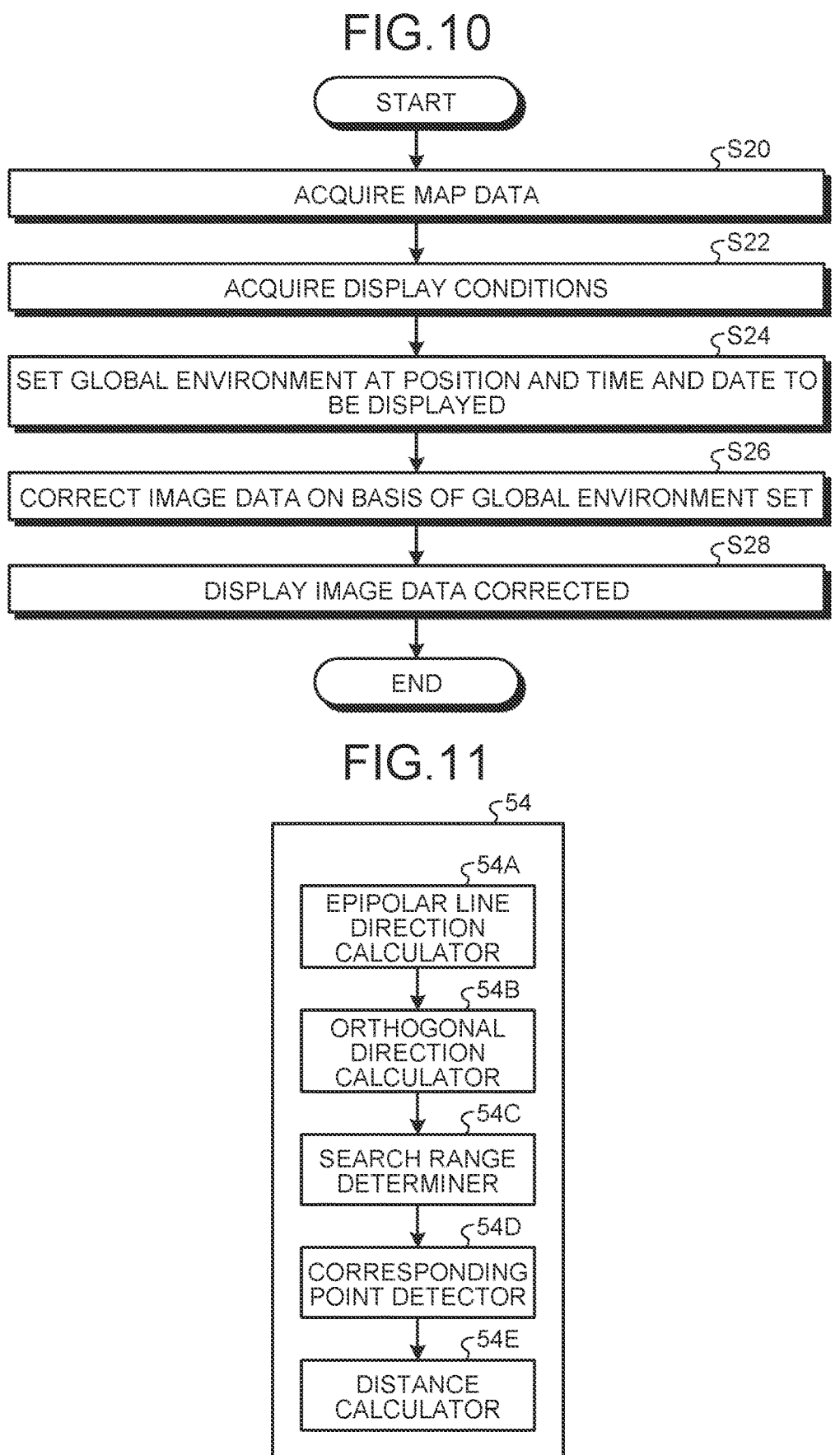

START

ACQUIRE MAP DATA — S20

ACQUIRE DISPLAY CONDITIONS — S22

SET GLOBAL ENVIRONMENT AT POSITION AND TIME AND DATE TO BE DISPLAYED — S24

CORRECT IMAGE DATA ON BASIS OF GLOBAL ENVIRONMENT SET — S26

DISPLAY IMAGE DATA CORRECTED — S28

END

EPIPOLAR LINE DIRECTION CALCULATOR — 54A

ORTHOGONAL DIRECTION CALCULATOR — 54B

SEARCH RANGE DETERMINER — 54C

CORRESPONDING POINT DETECTOR — 54D

DISTANCE CALCULATOR — 54E

DISPLAY DEVICE, DISPLAY METHOD, AND COMPUTER-READABLE STORAGE MEDIUM

CROSS-REFERENCE TO RELATED APPLICATIONS

This application is a Continuation of PCT International Application No. PCT/JP2022/024868 filed on Jun. 22, 2022, which claims the benefit of priority from Japanese Patent Application No. 2021-115135 filed on Jul. 12, 2021, the entire contents of both of which are incorporated herein by reference.

BACKGROUND

The present invention relates to a display device, a display method, and a computer-readable storage medium.

Generating map data representing states on the ground for respective positions is described in Japanese Patent No. 5921753, for example, the map data corresponding to polygons for drawing of a map intermediate between: spherical and rough map data on an earth object for car navigation; and detailed planar map data. Such map data are sometimes constructed by use of images of the ground as actually captured.

Imaging every spot on the ground at the same time is difficult and map data are thus constructed by combination of sets of image data on different spots that have been captured at different times. Therefore, when seen by a user, such ground data may look unnatural to the user because images of different spots may fail to look seamless.

SUMMARY

A display device according to an aspect of the present disclosure includes: a map data acquisition unit configured to acquire map data, the map data including image data of the ground as captured, a time and date at which the image data was captured, positional data indicating a position where the image data was captured, and environmental change data indicating a degree of change in global environment per unit time at the position where the image data was captured; a display condition acquisition unit configured to acquire information on a position and a time and date on the ground to be displayed; a global environment setting unit configured to set a global environment at the position and time and date to be displayed, by using a difference between the time and date at which the image data was captured and the time and date on the ground to be displayed, and the environmental change data; an image data correction unit configured to correct the image data such that the set global environment is obtained; and a display control unit configured to cause the corrected image data to be displayed.

A display method according to another aspect of the present disclosure includes: acquiring map data, the map data including image data of the ground as captured, a time and date at which the image data was captured, positional data indicating a position where the image data was captured, and environmental change data indicating a degree of change in global environment per unit time at the position where the image data was captured; acquiring information on a position and a time and date on the ground to be displayed; setting a global environment at the position and time and date to be displayed, by using a difference between the time and date at which the image data was captured and the time and date on the ground to be displayed, and the environmental change data; correcting the image data such that the set global environment is obtained; and displaying the corrected image data.

A non-transitory computer-readable storage medium according to still another aspect of the present disclosure stores a program causing a computer to execute: acquiring map data, the map data including image data of the ground as captured, a time and date at which the image data was captured, positional data indicating a position where image data was captured, and environmental change data indicating a degree of change in global environment per unit time at the position where the image data was captured; acquiring information on a position and a time and date on the ground to be displayed; setting a global environment at the position and time and date to be displayed, by using a difference between the time and date at which the image data was captured and the time and date on the ground to be displayed, and the environmental change data; correcting the image data such that the set global environment is obtained; and displaying the corrected image data.

BRIEF DESCRIPTION OF THE DRAWINGS

FIG. 2 is a schematic block diagram of an image acquisition device according to the embodiment;

FIG. 3 is a schematic diagram illustrating an example of format data;

FIG. 6 is a schematic diagram illustrating an example of map data;

FIG. 7 is a flowchart illustrating a flow of a process performed by the data generation device according to the embodiment;

FIG. 10 is a flowchart illustrating a flow of a process performed by the display device according to the embodiment;

FIG. 11 is a block diagram illustrating a specific configuration of a data generation unit;

DETAILED DESCRIPTION

An embodiment will be described hereinafter in detail, on the basis of the drawings. Embodiments of the present invention are not limited by the embodiment described hereinafter.

Data Generation System

Figure 1:
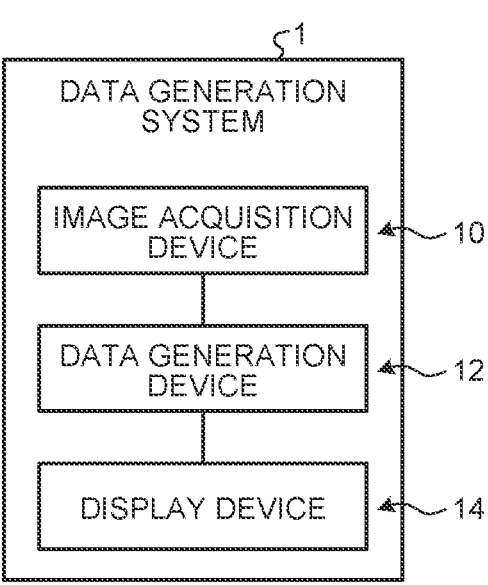
FIG. 1 is a schematic block diagram of a data generation system according to an embodiment.

FIG. 1 is a schematic block diagram of a data generation system according to the embodiment. As illustrated in FIG. 1, a data generation system 1 according to the embodiment has an image acquisition device 10, a data generation device 12, and a display device 14. The data generation system 1 acquires image data of the ground as captured by capturing an image of the ground by means of the image acquisition device 10, generates map data including the image data by means of the data generation device 12, and displays the map data by means of the display device 14.

Image Acquisition Device

Figure 2:
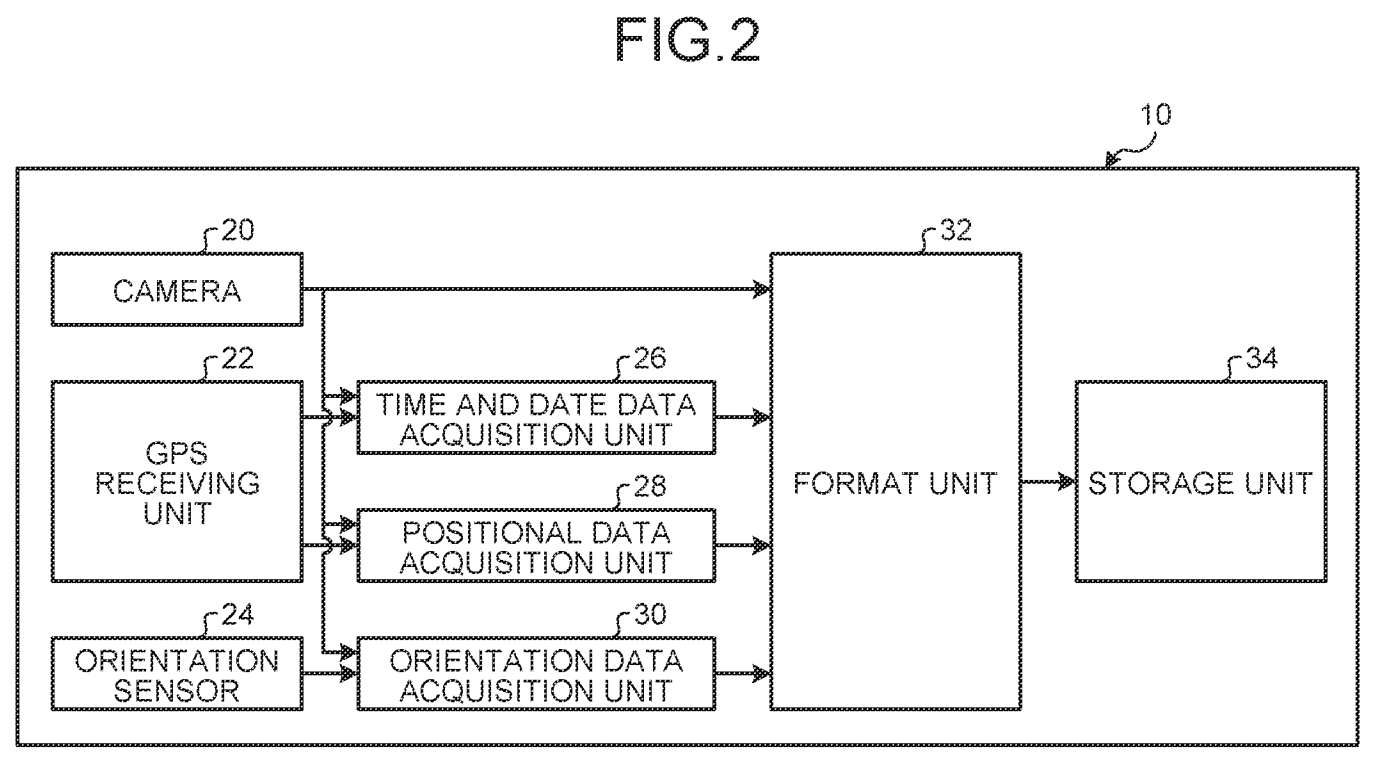

FIG. 2 is a schematic block diagram of an image acquisition device according to the embodiment. The image acquisition device 10 is a device that captures images of the ground and is an air vehicle, such as a drone, in this embodiment, for example. The image acquisition device 10 acquires image data on each position on the earth (image data of each spot on the ground as captured) by capturing images of the ground while moving. As illustrated in FIG. 2, the image acquisition device 10 includes a camera (imaging device) 20, a GPS receiving unit (GNSS signal receiver) 22, an orientation sensor 24, a time and date data acquisition unit 26, a positional data acquisition unit 28, an orientation data acquisition unit 30, a format unit 32, and a storage unit 34.

The camera 20 captures images of the ground. Image data captured by the camera 20 may be compressed into a format, such as the JPEG or PNG format, such that the resulting degradation is negligible. The camera 20 transmits the image data captured to the format unit 32 and also transmits the image data as trigger information to the time and date data acquisition unit 26, the positional data acquisition unit 28, and the orientation data acquisition unit 30.

The GPS receiving unit 22 receives radio waves from a satellite and sequentially acquires results of detection of the current times and dates and positions. The GPS receiving unit 22 transmits a result of detection of a time and date to the time and date data acquisition unit 26 and transmits a result of detection of a position to the positional data acquisition unit 28.

The orientation sensor 24 makes a measurement of inclination (an elevation angle) of the camera 20 by means of a gyroscope (angular velocity sensor). The orientation sensor 24 transmits a result of the measurement to the orientation data acquisition unit 30.

On the basis of the result of the detection of the time and date from the GPS receiving unit 22, the time and date data acquisition unit 26 acquires time and date data for when the image data was captured by the camera 20. The time and date data are information indicating when the image data was acquired (when the image of the ground was captured by the camera), and in this embodiment, include information on the year, month, day, and time. The time and date data acquisition unit 26 transmits the time and date data to the format unit 32.

The positional data acquisition unit 28 acquires, based on the result of the detection of the position from the GPS receiving unit 22, positional data for when the image data was captured by the camera 20. The positional data are information indicating the position where the image data was acquired (the position where the image of the ground was captured by the camera 20) and indicate the position of the spot where the image data was captured. In this embodiment, the position where the image acquisition device 10 was when the image data was acquired is acquired as the positional data, but without being limited to this example, the position of the spot where the image data was captured may be derived on the basis of the position where the image acquisition device 10 was when the image data was acquired, and the derived position may serve as the positional data. The positional data acquisition unit 28 transmits the positional data to the format unit 32.

On the basis of the result of the detection of the inclination of the camera 20 by the orientation sensor 24, the orientation data acquisition unit 30 acquires orientation data for when the image data was captured by the camera 20. The orientation data are information indicating the orientation of the camera 20 at the time when the image data was acquired (at the time when the image of the ground was captured by the camera 20). The orientation data acquisition unit 30 transmits the orientation data to the format unit 32.

The format unit 32 generates format data PD by associating the image data, the time and date data, the positional data, and the orientation data with one another. That is, the format data PD is data having the image data, the time and date data, the positional data, and the orientation data associated with one another, and in this embodiment, the format unit 32 generates the format data PD by converting the image data, the time and date data, the positional data, and the orientation data into a predetermined format. The format unit 32 sets the number of bytes per parameter, converts various types of information input, into the predetermined format, and thereby generates the format data PD. The format unit 32 transmits the format data PD to the storage unit 34. The time and date data and the orientation data are not essential, and the format data PD may be data having the image data and the positional data associated with each other.

The time and date data acquisition unit 26, the positional data acquisition unit 28, the orientation data acquisition unit 30, and the format unit 32 may be implemented by a calculation device included in the image acquisition device 10. The calculation device herein is, for example, a device including a calculation circuit, such as a central processing unit (CPU), and may implement the time and date data acquisition unit 26, the positional data acquisition unit 28, the orientation data acquisition unit 30, and the format unit 32 to execute their processes, by reading and executing programs (software) from the storage unit 34.

The storage unit 34 temporarily stores the format data PD. The storage unit 34 is a memory that stores various kinds of information, such as the content of calculation by the calculation device and the programs, and includes, for example, at least one of: a random access memory (RAM); a main storage, such as a read only memory (ROM); or an external storage, such as a hard disk drive (HDD). The storage unit 34 transmits the format data PD to an external database, via a communication unit (not illustrated in the drawings). The format data PD temporarily stored in the storage unit 34 are stored in, for example, a database on the Internet, on a large scale.

FIG. 3 is a schematic diagram illustrating an example of format data. As illustrated in FIG. 3, the format data PD include a fixed length portion in the first half and a variable length portion in the latter half. The fixed length portion has the time and date data, the positional data, and the orientation data. The time and date data is time and date information, and include, for example, two bytes of dominical year data, one byte of month data, one byte of day data, one byte of hour data, one byte of minute data, and one byte of second data. The positional data include, for example, eight bytes of latitude data and eight bytes of longitude data. Positional information may be written as relative coordinates on a horizontal axis and a vertical axis in an area sectioned in a predetermined size from a map. The orientation data include, for example, eight bytes of a horizontal orientation and eight bytes of elevation angle data. The orientation data acquired by the camera 20 is expressed as, for example, an expression using an analog clock, like three o'clock (90°) for east, six o'clock (180°) for south, nine o'clock (270°) for west, and twelve o'clock (360°) for north, in clockwise direction of the hand of the analog clock. As an elevation angle orientation, the number of degrees of the elevation angle to be looked up is recorded, where the horizontal angle is 0 degrees, and the angle right above is 90 degrees. The variable length portion is image data that is of an image compression file including an image that has been compressed in the JPG format or PNG format.

As described above, the image acquisition device 10 acquires image data on each position on the earth (image data of each spot on the ground as captured) by capturing images of the ground while moving. The format unit 32 generates format data PD for each position on the earth, that is, for each set of image data captured. Image data included in one set of format data PD in this embodiment is data on a single image of a single spot as captured, but without being limited to this example, the image data may include data on plural images. In this case, the data on the plural images may include image data of plural spots as captured or image data of the same spot as captured from different directions.

Data Generation Device

Figure 4:
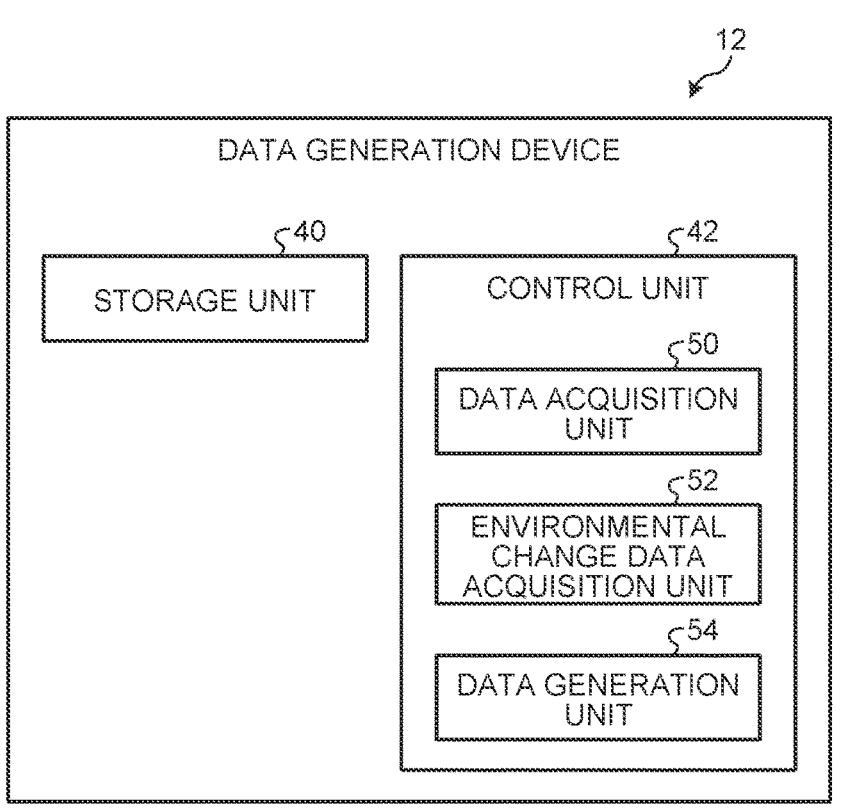
FIG. 4 is a schematic block diagram of a data generation device according to the embodiment.

FIG. 4 is a schematic block diagram of a data generation device according to the embodiment. The data generation device 12 according to the embodiment is, for example, a computer. As illustrated in FIG. 4, the data generation device 12 has a storage unit 40 and a control unit 42. The storage unit 40 is a memory that stores various types of information, such as content of calculation by the control unit 42 and programs, and includes, for example, at least one of: a RAM; a main storage like a ROM; or an external storage, such as an HDD.

The control unit 42 is a calculation device and includes, for example, a calculation circuit, such as a CPU. The control unit 42 includes a data acquisition unit 50, an environmental change data acquisition unit 52, and a data generation unit 54. By reading and executing programs (software) from the storage unit 40, the control unit 42 implements the data acquisition unit 50, the environmental change data acquisition unit 52, and the data generation unit 54 and executes their processes. The control unit 42 may execute their processes by means of a single CPU, or may include plural CPUs and execute their processes by means of these plural CPUs. Furthermore, at least part of the processes performed by the data acquisition unit 50, the environmental change data acquisition unit 52, and the data generation unit 54 may be implemented by hardware circuitry.

Data Acquisition Unit

The data acquisition unit 50 acquires image data of the ground as captured by the image acquisition device 10, positional data indicating the position where the image data was captured, and time and date data indicating a time and date when the image data was captured. In this embodiment, the data acquisition unit 50 acquires format data PD generated by the format unit 32 of the image acquisition device 10. The data acquisition unit 50 may acquire the format data PD from an external database via a communication unit (not illustrated in the drawings) included in the data generation device 12 or may acquire the format data PD directly from the image acquisition device 10.

Accordingly, the data acquisition unit 50 acquires format data PD generated by the format unit 32 of the image acquisition device 10. However, without being limited to this example, the data acquisition unit 50 may have functions of the format unit 32. In this case, the data acquisition unit 50 may acquire, via the communication unit (not illustrated in the drawings), image data, time and date data, positional data, and orientation data acquired by the image acquisition device 10 and generate format data PM by associating these sets of data with one another.

Environmental Change Data Acquisition Unit

The environmental change data acquisition unit 52 acquires environmental change data for a position where image data have been captured. The environmental change data is information indicating a degree of change in global environment per unit time at that position. A global environment herein refers to a physical phenomenon (natural phenomenon) that changes on a global scale and can be said to be a natural phenomenon determined according to a position and a time and date. That is, a global environment herein refers to something that changes yearly, seasonally, and hourly, and thus changes over time. Furthermore, a global environment herein differs from position (terrestrial coordinates) to position on the ground, and for example, global environments at different positions may differ from each other even at the same time and date.

Figure 5:
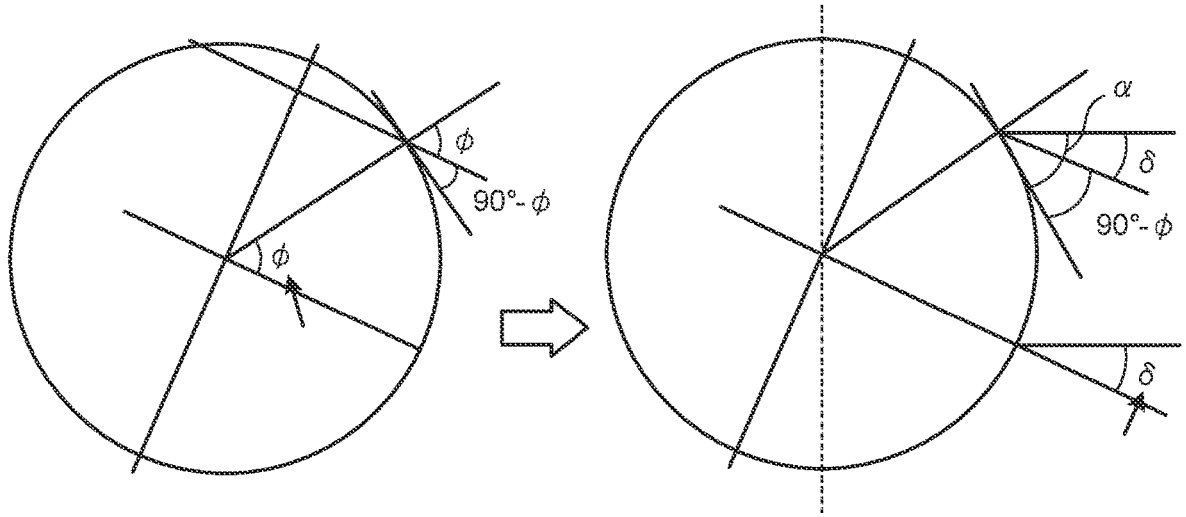
FIG. 5 is a schematic diagram for description of a method of calculating an incidence angle of sunlight.

In this embodiment, an incidence angle of sunlight is a global environment. An incidence angle of sunlight is determined by a positional relation between the sun and terrestrial coordinates and can thus be said to be a natural phenomenon determined according to a position and a time and date. An incidence angle of sunlight is able to be calculated as follows, for example. FIG. 5 is a schematic diagram for description of a method of calculating an incidence angle of sunlight. That is, the axis of the earth is inclined by about 23.5° to a line perpendicular to the plane of the orbital path and the incidence angle of sunlight changes according to where on the orbital path the earth is positioned. Furthermore, because the earth is a sphere and rotates on its own axis, the incidence angle of sunlight changes according to the latitude and the time (that is, the longitude). Therefore, the incidence angle of sunlight can be said to be determined by the orbital position (season), latitude, and time (longitude). For example, the incidence angle of sunlight at a spot at the longitude of 0° (the location of the Royal Greenwich Observatory) at noon is able to be calculated by Equation (1) below.

$$\alpha = 90 - \Phi + \delta \tag{1}$$

As illustrated in FIG. 5, $\alpha$ in Equation (1) is the incidence angle of sunlight at noon and can be said to be the southing height angle (the angle formed between the sun at the southing height and the surface of the ground). Furthermore, $\Phi$ in Equation (1) is the latitude and $\delta$ is the declination (the angle formed between the equatorial plane of the earth and a sunbeam).

The environmental change data acquisition unit 52 acquires environmental change data indicating a degree of change in global environment per unit time at a position indicated by positional data included in format data PD. As described above, the global environment changes according to the position and time and date, and thus if a position is prescribed, the degree of change in global environment per unit time at that position is able to be calculated. On the basis of the positional data, the environmental change data acquisition unit 52 acquires, as the environmental change data, the degree of change in global environment per unit time at the position indicated by the positional data, that is, the degree of change in global environment per unit time at the position where the image data was captured. The environmental change data acquisition unit 52 may acquire the environmental change data by any method on the basis of the positional data. For example, a table having positions (terrestrial coordinates) and degrees of change in global environment per unit time associated with each other may be stored in the storage unit 40 and the environmental change data acquisition unit 52 may acquire, as the environmental change data, the degree of change in global environment per unit time, the degree of change having been associated, in the table, with the position indicated by the positional data.

The environmental change data acquisition unit 52 acquires sets of environmental change data respectively for sets of format data PD, that is, for sets of image data captured at different positions.

Data Generation Unit

The data generation unit 54 generates map data MD representing a state on the ground by associating image data, positional data, time and date data, and environmental change data with one another. That is, the data generation unit 54 generates a unit of map data PM0 representing a state on the ground at one spot (position) by associating image data, positional data, time and date data, and environmental change data with one another and generates map data PM by combining units of map data PM0 on respective positions on the ground. That is, the map data PM correspond to a group of the units of map data PM0 and can be said to be a data group representing states on the ground at the respective positions.

FIG. 6 is a schematic diagram illustrating an example of map data. As illustrated in FIG. 6, the data generation unit 54 associates format data PD with environmental change data on a position indicated by positional data included in the format data PD and thereby generates a unit of map data PM0 on that position. That is, a unit of map data PM0 in this embodiment can be said to be data having time and date data, positional data, orientation data, image data, and environmental change data associated with one another. By associating each set of format data PD with environmental change data, the data generation unit 54 generates a unit of map data PM0 for each position on the ground and combines units of map data PM0 into map data PM. The time and date data and orientation data are not essential and a unit of map data PM0 may be data having image data, positional data, and environmental change data associated with one another.

As described above, the data generation device 12 generates map data PM. The following description is on a flow of a process of generating the map data PM described above. FIG. 7 is a flowchart illustrating a flow of a process performed by the data generation device according to the embodiment. As illustrated in FIG. 7, the data generation device 12 acquires, by means of the data acquisition unit 50, format data PD, that is, image data, positional data, time and date data, and orientation data (Step S10). The data generation device 12 acquires, by means of the environmental change data acquisition unit 52, environmental change data on a position indicated by the positional data (Step S12) and generates, by means of the data generation unit 54, a unit of map data MD0 by associating the image data, positional data, time and date data, and orientation data (format data PD) with the environmental change data (Step S14). In a case where there are no other image data (format data PD) (Step S16; No), the data generation device 12 combines the units of map data MD0 generated thus far, thereby generates map data MD, and ends the process. On the contrary, in a case where there are other image data (format data PD) (Step S16; Yes), the data generation device 12 returns to Step S10 and repeats the generation of a unit of map data MD0.

In a case where map data is generated by capturing images of respective spots on the ground, sets of image data on the respective spots that have been captured at different times are combined and the map data is thereby constructed, because capturing the images of all of these spots at the same time is difficult. Therefore, in a case where the map data is displayed, the images captured at different times and in discretely different global environments are lined up and the images of the respective spots may thus fail to look seamless and may look unnatural to a user. However, in this embodiment, image data of a spot as captured and environmental change data indicating a degree of change in global environment at that spot are stored in association with each other. Therefore, for example, correcting the image data on the respective spots by use of the environmental change data so that the global environments are uniformized reduces the discrete change in global environment according to the position and reduces the unnaturalness noticed by the user. Furthermore, for example, correcting the image data so that the global environment at the time the user desires to see is reflected in the image data by use of the environmental change data also enables reduction of the unnaturalness noticed by the user.

Display Device

Figure 8:
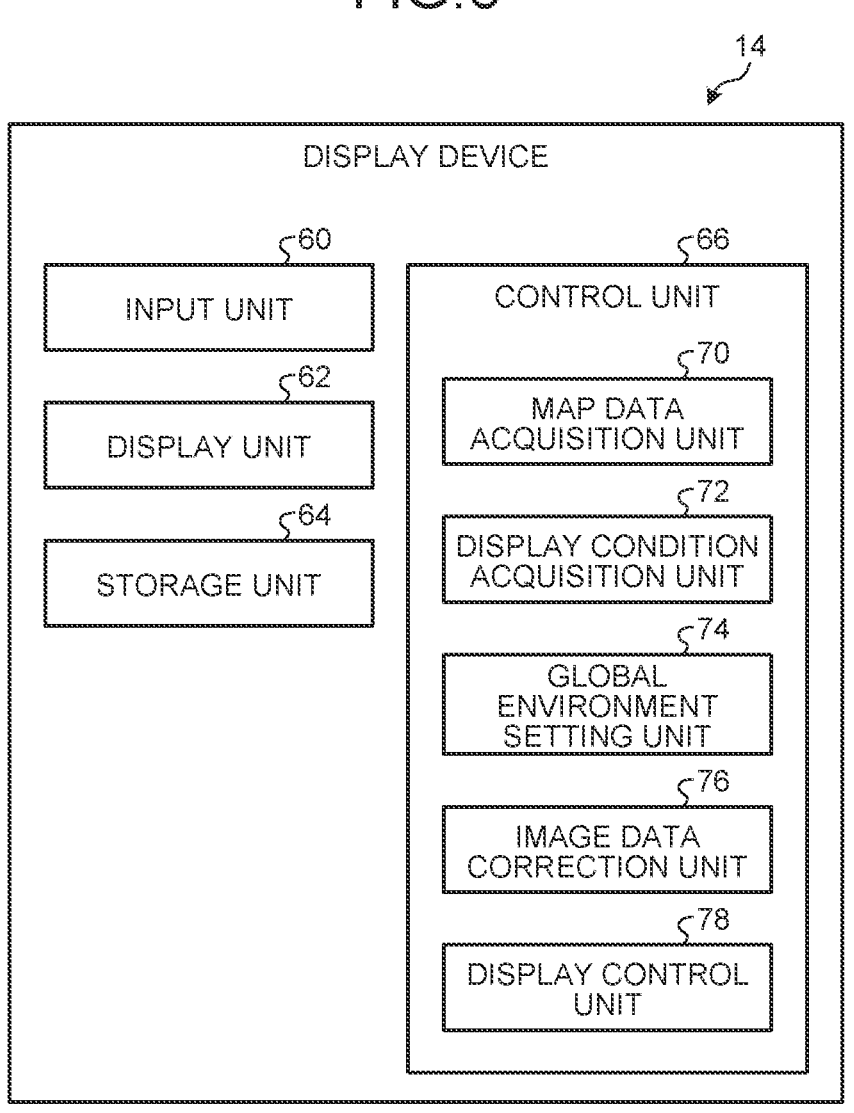
FIG. 8 is a schematic block diagram of a display device according to the embodiment.

FIG. 8 is a schematic block diagram of a display device according to the embodiment. As illustrated in FIG. 8, the display device 14 has an input unit 60, a display unit 62, a storage unit 64, and a control unit 66. The input unit 60 is a mechanism to receive operation by a user and may be, for example, a mouse, a keyboard, or a touch panel. The display unit 62 is a display to display images. The storage unit 64 is a memory that stores various types of information, such as content of calculation by the control unit 66 and programs, and includes, for example, at least one of: a RAM; a main storage like a ROM; or an external storage, such as an HDD.

The control unit 66 is a calculation device and includes, for example, a calculation circuit, such as a CPU. The control unit 66 includes a map data acquisition unit 70, a display condition acquisition unit 72, a global environment setting unit 74, an image data correction unit 76, and a display control unit 78. The control unit 66 implements the display condition acquisition unit 72, the global environment setting unit 74, the image data correction unit 76, and the display control unit 78 and execute their processes by reading and executing programs (software) from the storage unit 64. The control unit 66 may execute these processes by means of a single CPU, or may include plural CPUs and execute the processes by means of these plural CPUs. Furthermore, at least part of the processes performed by the display condition acquisition unit 72, the global environment setting unit 74, the image data correction unit 76, and the display control unit 78 may be implemented by hardware circuitry.

Map Data Acquisition Unit

The map data acquisition unit 70 acquires map data MD including image data, positional data, and environmental change data. The map data acquisition unit 70 acquires the map data MD generated by the data generation device 12 by receiving the map data MD via a communication unit (not illustrated in the drawings). The map data MD generated by the data generation device 12 may be stored in the storage unit 64 and the map data acquisition unit 70 may read the map data MD from the storage unit 64.

Display Condition Acquisition Unit

The display condition acquisition unit 72 acquires display conditions for displaying map data MD as an image. The display conditions are information indicating a state where the map data MD is to be displayed as the image. In this embodiment, the display conditions are a position and a time and date, and in other words, the display conditions can be said to be information on a position and a time and date on the ground to be displayed (information specifying the position and the time and date of the image to be displayed). The display condition acquisition unit 72 may acquire the display conditions by any method, but in this embodiment, acquires the display conditions input by a user via the input unit 60. That is, in this embodiment, the display condition acquisition unit 72 acquires the display conditions set by the user. However, without being limited to this example, the display conditions may be set by default beforehand.

Global Environment Setting Unit

On the basis of environmental change data included in map data MD, the global environment setting unit 74 sets a global environment at a position and a time and date indicated by display conditions. Specifically, the global environment setting unit 74 extracts a unit of map data MD0 corresponding to a position specified by display conditions from map data MD (a unit of map data MD0 having positional data matching the position specified by the display conditions). On the basis of the time and date indicated by the display conditions and the environmental change data included in the unit of map data MD0 extracted, the global environment setting unit 74 then calculates a global environment at the time and date indicated by the display conditions, the global environment being at the position specified by the display conditions. That is, because a global environment at a reference time and date is already known, the global environment at the position and time and date indicated by the display conditions is able to be calculated from a difference between the reference time and date and the time and date indicated by the display conditions and the environmental change data (the degree of change in global environment per unit time). The global environment at the reference time and date may be included in the unit of map data MD0 beforehand, or may be calculated by the global environment setting unit 74 on the basis of the unit of map data MD0. Furthermore, the reference time and date may be set in any way, but may be, for example, the time and date (the time and date indicated by the time and date data) at which the image data was captured.

Image Data Correction Unit

The image data correction unit 76 corrects image data so that a global environment set by the global environment setting unit 74 is obtained. That is, the image data correction unit 76 corrects the image data so that an image captured under the set global environment is obtained, in other words, an image captured under the global environment at the time and date specified by the display conditions is obtained. The image data correction unit 76 may use any method of correcting image data, but for example, may calculate luminance values of respective pixels of an image assumed to be captured under the global environment at the time and date specified by the display conditions and correct the image data such that an image having the calculated luminance values is obtained. Furthermore, for example, the image data correction unit 76 may calculate at least one of chroma of each pixel or a length of a shadow of light, for an image assumed to be captured under the global environment at the time and date specified by the display conditions and correct the image data so that an image having the calculated at least one of the chroma of each pixel or the length of the shadow of the light is obtained. In a case where the shadow is represented by the magnitude of luminance of pixels, the luminance of the pixels may be corrected such that a shadow having the calculated length is obtained.

Figure 9:
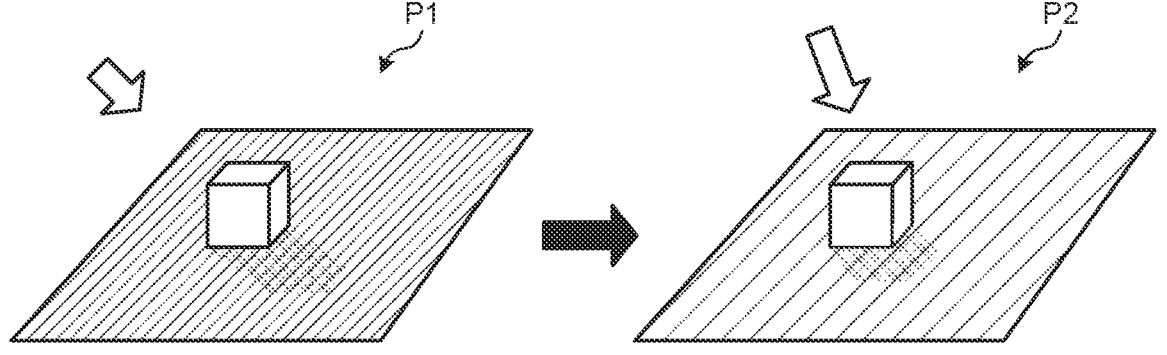
FIG. 9 is a schematic diagram illustrating an example of image data that have been corrected.

FIG. 9 is a schematic diagram illustrating an example of image data that have been corrected. In this embodiment, a global environment is an incidence angle of sunlight and the image data correction unit 76 thus corrects image data so that an image having sunlight incident at an incidence angle at a time and date specified by display conditions is obtained. An image P1 in FIG. 9 is an example of an image from image data before correction and an image P2 is an example of an image from the image data after the correction. As illustrated in FIG. 9, the distribution of brightness changes as the incidence angle of sunlight changes, and the image data correction unit 76 may thus calculate luminance values of pixels at an incidence angle of sunlight at a time and date specified by display conditions and correct the image data so that an image having the luminance values calculated is obtained.

Display Control Unit

The display control unit 78 displays image data corrected by the image data correction unit 76 on the display unit 62. That is, the display control unit 78 displays a captured image of the ground (map data) at a position and a time and date specified by a user.

A user may change the position to be displayed by operation for, for example, enlargement or reduction of the map data, or movement of the position. In this case, the image data correction unit 76 corrects the set of image data on each position so that an image under the global environment at the specified time and date is obtained and if the position to be displayed is changed, the display control unit 78 displays the corrected image corresponding to the changed position. The global environments of the images of respective positions on the ground are thereby made to correspond to the same time and date specified and the discrete change in global environment according to the position will thus be reduced and the displayed image will look less unnatural to the user.

The display device 14 generates image data that have been corrected as described above and displays a captured image of the ground by using the image data that have been corrected. The following description is on a flow of a process performed by the display device 14. FIG. 10 is a flowchart illustrating a flow of a process performed by the display device according to the embodiment. As illustrated in FIG. 10, the display device 14 according to the embodiment acquires, by means of the map data acquisition unit 70, map data MD (Step S20), acquires, by means of the display condition acquisition unit 72, display conditions indicating a position and a time and date to be displayed (Step S22), and sets, by means of the global environment setting unit 74, a global environment at the position and time and date to be displayed, on the basis of environmental change data (Step S24). On the basis of the global environment set, the display device 14 corrects, by means of the image data correction unit 76, image data on the position to be displayed (Step S26), and causes, by means of the display control unit 78, the corrected image data to be displayed on the display unit 62 (Step S28).

As described above, on the basis of the environmental change data, the display device 14 sets the global environment at the position and time and date to be displayed, and corrects the image data of the ground as captured so that an image in that global environment is obtained. Therefore, for example, correcting the image data on the respective spots so that their global environments are uniformized will reduce the discrete change in global environment according to the position and the image will look less unnatural to the user. Furthermore, for example, correcting the image data so that the global environment at the time and date the user desires to see is reflected in the image data by use of the environmental change data also enables the image to look less unnatural to the user.

According to the above description, the data generation device 12 that generates map data and the display device 14 that displays the map data are different devices, but generation and display of map data may be implemented by a single device. That is, for example, the data generation device 12 may additionally have at least part of functions of the display device 14 and perform generation and display of map data, or the display device 14 may additionally have at least part of functions of the data generation device 12 and perform generation and display of map data.

Furthermore, in this embodiment, a global environment is an incidence angle of sunlight, but the embodiment is not limited to this example. For example, a global environment may be snowfall, the size of ice, an ocean current, or westerlies, for example. Examples of a global environment also include: a change in a coastline or in the water level of a lake due to a positional relation between a position on a surface of the ground and a position of the moon (day-to-day ebb and flow); a seasonal change (in a dry season or a wet season) in the sea level, the water level of a lake or river, or the width of a river; a seasonal change in the color of a mountain, farmland, or trees (opening of buds, fresh leaves, greenery, flowers, red leaves, leaf fall, snowfall, or thawing of snow).

Method of Generating Three-Dimensional Image Data

Image data according to the embodiment may be any image data of the ground as captured and thus may be two-dimensional image data or three-dimensional image data. In a case where the image data is three-dimensional image data, the three-dimensional image data on a spot may be generated on the basis of plural sets of image data on the same spot captured from different directions. The following description is on an example of a method of generating three-dimensional image data.

Figure 12:
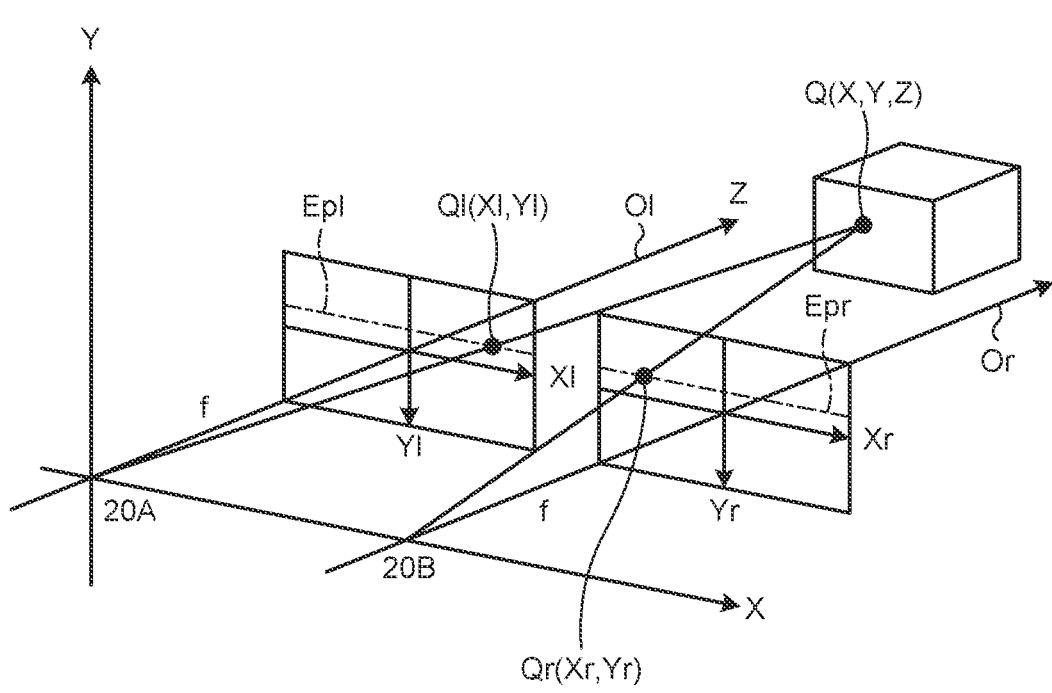
FIG. 12 is a diagram illustrating a positional relation between two images, to which principles of photogrammetry are applied.
Figure 13:
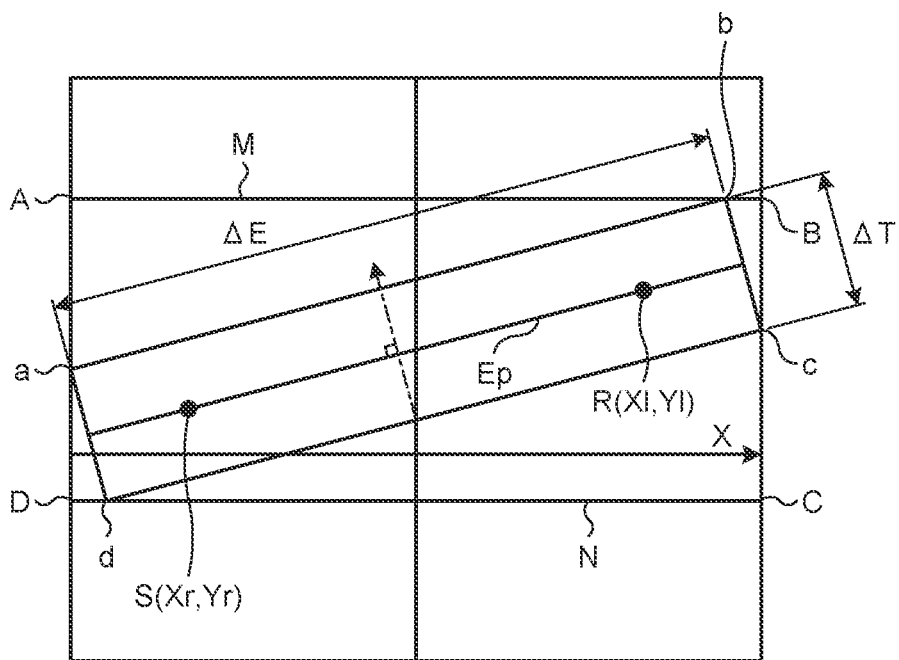
FIG. 13 is a diagram illustrating a positional relation between two images.

FIG. 11 is a block diagram illustrating a specific configuration of a data generation unit, FIG. 12 is a diagram illustrating a positional relation between two images, to which principles of photogrammetry are applied, and FIG. 13 is a diagram illustrating a positional relation between two images.

As illustrated in FIG. 11, the data generation unit 54 of the data generation device 12 has an epipolar line direction calculator 54A, an orthogonal direction calculator 54B, a search range determiner 54C, a corresponding point detector 54D, and a distance calculator 54E.

On the basis of plural sets of image data acquired by the data acquisition unit 50, the epipolar line direction calculator 54A calculates a direction of an epipolar line joining corresponding plural pixel points of the plural sets of image data for an object. The epipolar line direction calculator 54A transmits the calculated direction of the epipolar line to the orthogonal direction calculator 54B.

The orthogonal direction calculator 54B calculates an orthogonal direction orthogonal to the epipolar line. The orthogonal direction calculator 54B outputs the calculated orthogonal direction orthogonal to the epipolar line, to the search range determiner 54C.

The search range determiner 54C determines a two-dimensional search range, in the direction of the epipolar line and the orthogonal direction orthogonal to the epipolar line, on a screen, the two dimensional search range including the corresponding plural pixel points. The search range determiner 54C outputs the two-dimensional search range determined, to the corresponding point detector 54D.

On the basis of the plural sets of image data acquired by the data acquisition unit 50 and the two-dimensional search range determined, the corresponding point detector 54D finds a parallax vector by searching for corresponding points. The corresponding point detector 54D transmits the parallax vector found, to the distance calculator 54E.

The distance calculator 54E finds an epipolar line direction component of the parallax vector by mapping the parallax vector onto the epipolar line and calculates, on the basis of the epipolar line direction component found, a distance to the object.

Generation of three-dimensional image data will hereinafter be described specifically, and in a case described hereinafter, three-dimensional image data is generated from two sets of image data.

The data generation unit 54 extracts two sets of image data for the same position indicated by sets of positional data corresponding to the two sets of image data, for example. The same position is not limited to the exact same position and positions that are different from each other by a predetermined amount may be regarded as being the same.

Firstly, two sets of image data on an object are obtained by a camera 20A for an image of the field of view and a camera 20B for an image of the field of view (see FIG. 12). Subsequently, the corresponding point detector 54D searches for corresponding points of a feature point, on the basis of the two sets of image data. For example, the corresponding point detector 54D performs mapping for each pixel to search for a position where the difference is minimized. As illustrated in FIG. 11 and FIG. 12, the cameras 20A and 20B that are present at two viewpoints at the same time are assumed to be arranged in a relation $Yl=Yr$ so that optical axes Ol and Or are included in the same X-Z coordinate plane. A parallax vector corresponding to an angle difference for each pixel is calculated by using corresponding points retrieved by the corresponding point detector 54D.

Because the parallax vector obtained corresponds to a distance from the cameras 20A and 20B in a depth direction, the distance calculator 54E performs distance calculation based on proportionality to the magnitude of parallax by use of perspective. If the cameras 20A and 20B of a photographer are assumed to move only substantially horizontally, arranging the cameras 20A and 20B so that their optical axes Ol and Or are included in the same X-Z coordinate plane allows the search for corresponding points to be performed only on scan lines that are epipolar lines Epl and Epr. The distance calculator 54E generates three-dimensional image data on the object by using the two sets of image data on the object and respective distances to the object from the cameras 20A and 20B.

In a case where a point $Ql(Xl, Yl)$ on a left image and a point $Qr(Xr, Yr)$ on a right image correspond to each other, a parallax vector at the point $Ql(Xl, Yl)$ is $Vp(Xl-Xr, Yl-Yr)$. The two points Ql and Qr are on the same scan line (epipolar line) and thus $Yl=Yr$, and the parallax vector is thus expressed as $Vp(Xl-Xr, 0)$. The epipolar line direction calculator 54A finds such a parallax vector Vp for every pixel point on the image, generates a group of parallax vectors, and thereby obtains depth direction information on the image. For a set having an epipolar line that is not horizontal, the height of the position of one of the cameras may be different (although such a probability is low) from the other. In this case, as compared to a case where a search for corresponding points is performed in a large two-dimensional area without regard to matching of corresponding points in a large search range, the orthogonal direction calculator 54B makes a search in a rectangle corresponding to the shift from the horizontal along the epipolar line and along the orthogonal direction orthogonal to the epipolar line and the amount of calculation for the minimum rectangle is thus less and reasonable. FIG. 13 illustrates the search range related to the minimum rectangle and determined by the search range determiner 54C in a case where the search range along the epipolar line is a to b=c to d and the search range along the orthogonal direction orthogonal to the epipolar line is b to c=d to a. In this case, the search width along the epipolar line is denoted by ΔE and the search width along a direction T orthogonal to the epipolar line is denoted by ΔT. The minimum rectangle ABCD that includes the minimum inclined rectangle abcd and is not inclined is the area to be found.

As described above, the data generation unit 54 finds a parallax vector by use of epipolar constraints from corresponding points of a feature point for the plural cameras 20A and 20B, obtains depth direction information on each point, performs mapping of texture on a three-dimensionally shaped surface, and thereby generates three-dimensional image data. A model of a portion of image data used in calculation is thereby able to reproduce a space visible from a front hemisphere thereof. Furthermore, in a case where there is a portion not captured in image data of three-dimensional image data, if portions around that portion are able to be connected by extension of a line or a surface of texture of those portions, interpolation for the portion is performed by use of the same texture.

The method of generating three-dimensional image data is not limited to the one described above, and any other method may be used instead.

Effects

As described above, the data generation device 12 according to the embodiment includes the data acquisition unit 50, the environmental change data acquisition unit 52, and the data generation unit 54. The data acquisition unit 50 acquires image data of the ground as captured and positional data indicating a position where the image data was captured. The environmental change data acquisition unit 52 acquires environmental change data indicating a degree of change in global environment per unit time at a position where the image data was captured. The data generation unit 54 generates map data MD representing a state on the ground by associating the image data, the positional data, and the environmental change data with one another.

The data generation device 12 stores image data of a spot as captured and environmental change data indicating a degree of change in global environment at that spot with each other and causes the associated image data and environmental change data to be stored as map data. Therefore, using such map data enables the image to look less unnatural to a user. For example, correcting image data on respective spots so that their global environments are uniformized will reduce the discrete change in global environment according to the position and will enable the image to look less unnatural to the user. Furthermore, for example, correcting the image data so that the global environment at the time and date the user desires to see is reflected in the image data by use of the environmental change data also enables the image to look less unnatural to the user.

Furthermore, the data generation unit 54 generates, for each position on the ground, a unit of map data MD0 having image data, positional data, and environmental change data associated with one another, and combines the units of map data MD0 on the respective positions on the ground into map data MD. Generating the units of map data MD0 on the respective positions enables correction of the global environment per position and enables the image to look less unnatural to the user in a more preferable manner.

Furthermore, the environmental change data acquisition unit 52 acquires, as environmental change data, a degree of change in incidence angle of sunlight per unit time at a position where image data was captured. Correcting the incidence angle of sunlight as a global environment enables reduction of discrete change in the degree of exposure to sunlight according to the position and enables the image to look less unnatural to the user.

The display device 14 according to the embodiment includes the map data acquisition unit 70, the display condition acquisition unit 72, the global environment setting unit 74, the image data correction unit 76, and the display control unit 78. The map data acquisition unit 70 acquires map data MD including image data of the ground as captured, positional data indicating a position where the image data was captured, and environmental change data indicating a degree of change in global environment per unit time at the position where the image data was captured. The display condition acquisition unit 72 acquires information on a position and a time and date on the ground to be displayed. On the basis of the environmental change data, the global environment setting unit 74 sets a global environment at the position and time and date to be displayed. The image data correction unit 76 corrects the image data so that the global environment that has been set is obtained. The display control unit 78 causes the corrected image data to be displayed.

As described above, on the basis of the environmental change data, the display device 14 sets the global environment at the position and time and date to be displayed, and corrects the image data of the ground as captured so that an image in that global environment is obtained. Therefore, for example, correcting the image data on the respective spots so that the global environments are uniformized will reduce the discrete change in global environment according to the position and the image will look less unnatural to the user. Furthermore, for example, correcting the image data so that the global environment at the time and date the user desires to see is reflected in the image data by use of the environmental change data also enables the image to look less unnatural to the user.

As described above, on the basis of the environmental change data, the display device 14 sets the global environment at the position and time and date to be displayed, and corrects the image data of the ground as captured so that an image in that global environment is obtained. Therefore, for example, correcting the image data on the respective spots so that the global environments are uniformized will reduce the discrete change in global environment according to the position and the image will look less unnatural to the user. Furthermore, for example, correcting the image data so that the global environment at the time and date the user desires to see is reflected in the image data by use of the environmental change data enables the image to look less unnatural to the user.

Furthermore, the environmental change data correspond to the degree of change in incidence angle of sunlight per unit time at the position where the image data was captured, the global environment setting unit 74 calculates the incidence angle of sunlight at the position and time and date to be displayed, and the image data correction unit 76 corrects the image so that an image having sunlight incident at the calculated incidence angle of sunlight is obtained. Correcting the incidence angle of sunlight as a global environment enables reduction in discrete change in the degree of exposure to sunlight according to the position and enables the image to look less unnatural to the user.

A program for executing each of the above-described methods may be provided by being stored in a non-transitory computer-readable storage medium, or may be provided via a network such as the Internet. Examples of the computer-readable storage medium include optical discs such as a digital versatile disc (DVD) and a compact disc (CD), and other types of storage devices such as a hard disk and a semiconductor memory.

An embodiment enables reduction of unnaturalness noticed by users.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device, comprising:
a map data acquisition unit configured to acquire map data, the map data including image data of the ground as captured, a time and date at which the image data was captured, positional data indicating a position where the image data was captured, and environmental change data indicating a degree of change in global environment per unit time at the position where the image data was captured;
a display condition acquisition unit configured to acquire information on a position and a time and date on the ground to be displayed;
a global environment setting unit configured to set a global environment at the position and time and date to be displayed, by using a difference between the time and date at which the image data was captured and the time and date on the ground to be displayed, and the environmental change data;
an image data correction unit configured to correct the image data such that the set global environment is obtained; and
a display control unit configured to cause the corrected image data to be displayed.

2. The display device according to claim 1, wherein the image data correction unit is configured to calculate luminance values of pixels at an incidence angle of sunlight, and to correct the image data so that an image having the calculated luminance values is obtained.

3. A display method, comprising:
acquiring map data, the map data including image data of the ground as captured, a time and date at which the image data was captured, positional data indicating a position where the image data was captured, and environmental change data indicating a degree of change in global environment per unit time at the position where the image data was captured;
acquiring information on a position and a time and date on the ground to be displayed;
setting a global environment at the position and time and date to be displayed, by using a difference between the time and date at which the image data was captured and the time and date on the ground to be displayed, and the environmental change data;
correcting the image data such that the set global environment is obtained; and
displaying the corrected image data.

4. A non-transitory computer-readable storage medium storing a program causing a computer to execute:
acquiring map data, the map data including image data of the ground as captured, a time and date at which the image data was captured, positional data indicating a position where the image data was captured, and environmental change data indicating a degree of change in global environment per unit time at the position where the image data was captured;
acquiring information on a position and a time and date on the ground to be displayed;
setting a global environment at the position and time and date to be displayed, by using a difference between the time and date at which the image data was captured and the time and date on the ground to be displayed, and the environmental change data;
correcting the image data such that the set global environment is obtained; and
displaying the corrected image data.

* * * * *